(12) United States Patent
Sau

(10) Patent No.: US 6,369,132 B2
(45) Date of Patent: *Apr. 9, 2002

(54) FINE PARTICLE SIZE LOW BULK DENSITY THERMOPLASTIC POLYMERS

(75) Inventor: Arjun Chandra Sau, Newark, DE (US)

(73) Assignee: Hercules Incorporated, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/953,138

(22) Filed: Oct. 17, 1997

(51) Int. Cl.[7] .............................. C08J 3/14; C08L 1/28; C08L 29/14; C08L 75/00
(52) U.S. Cl. .................. 523/332; 523/340; 524/549; 524/556; 524/559; 524/592; 524/593; 524/612; 525/92 K; 525/398; 525/471; 528/501; 536/43; 536/44
(58) Field of Search ................ 525/92 K, 398, 525/471; 523/332, 340; 528/501; 524/612, 549, 556, 559, 592, 593; 536/43, 44

(56) References Cited

U.S. PATENT DOCUMENTS

| | | | | |
|---|---|---|---|---|
| 3,896,196 A | | 7/1975 | Dickey et al. ................ 264/6 |
| 4,344,934 A | * | 8/1982 | Martin et al. ................ 424/80 |
| 4,853,259 A | * | 8/1989 | Taha ........................ 252/140 |
| 5,096,490 A | * | 3/1992 | Burdick .................... 106/504 |
| 5,256,737 A | | 10/1993 | Barzaghi ................ 525/328.9 |
| 5,290,829 A | | 3/1994 | Angerer et al. .............. 524/31 |
| 5,294,661 A | * | 3/1994 | Takaya et al. ............ 525/92 K |
| 5,412,019 A | * | 5/1995 | Roulstone et al. ......... 523/206 |
| 5,534,585 A | * | 7/1996 | Roulstone et al. ......... 523/206 |
| 5,574,127 A | | 11/1996 | Sau ......................... 528/125 |
| 5,583,166 A | | 12/1996 | Okamoto et al. ........... 523/340 |
| 5,792,475 A | * | 8/1998 | Davis et al. ................ 424/489 |

FOREIGN PATENT DOCUMENTS

| | | | |
|---|---|---|---|
| GB | 2 351 501 | * | 1/2001 |

* cited by examiner

Primary Examiner—Peter Szekely
(74) Attorney, Agent, or Firm—David Edwards; Ivan G. Szanto

(57) ABSTRACT

Fine particulate thermoplastic polymers [e.g., hydrophobically modified polyether-polyurethanes, polyacrylates, polyvinyl alcohol, polyether-polyols, polyacrylamide, aminoplast-polyethers and poly(acetal- or ketal-polyethers] having reduced bulk density, process of making same by dissolving the polymer and rapidly insolubilizing the polymer from the solution and process of using aqueous suspensions of such polymers as thickeners for aqueous systems.

15 Claims, No Drawings

FINE PARTICLE SIZE LOW BULK DENSITY THERMOPLASTIC POLYMERS

BACKGROUND OF THE INVETION

1. Field of Invention

The present invention relates to low bulk density thermoplastic polymers and more particularly it relates to fine particle size water-soluble synthetic or semisynthetic associative thickeners having low bulk density.

2. Description of the Prior Art

In general, the bulk density of polymer particles is lowered for ease of processing, handling and flow. In many situations, it is desirable to temporarily suspend polymer particles in a liquid medium for ease of handling and transportation. One of the ways to achieve this goal is to lower the bulk density of the polymer particles. In addition, by lowering bulk density, dissolution of polymer particles in an appropriate solvent can be accelarated. Low bulk density polymer particles are of special interest for fabricating light-weight products and separating solvents.

Various water-soluble polymers are used to thicken and control rheology of waterborne industrial systems, such as latex paints and personal care products. These include natural and chemically modified polysaccharides, proteins and synthetic water-soluble polymers. Examples include hydroxyethylcellulose (HEC), hydrophobically modified hydroxyethylcellulose (HM-HEC), ethylhydroxyethylcellulose, hydrophobically modified ethylhydroxyethylcellulose, methylhydroxypropylcellulose, carboxymethylcellulose, guar and guar derivatives, starch and starch derivatives, casein, polyacrylates, polyacrylamides, and polyalkylene oxides.

In the last fifteen years, a new class of hydrophobically modified synthetic water-soluble polymers (HM-WSPs) have gained extensive commercial importance for formulating waterborne coatings and suspensions to achieve desired paint properties, such as flow, leveling, film build and gloss. These HM-WSPs are composed of water-soluble and water-insoluble components. They are dubbed "associative thickeners" as they thicken aqueous systems by intermolecular hydrophobic associations and/or hydrophobic associations between their hydrophobic moieties and other hydrophobic entities present in the system. Various types of synthetic associative thickeners (SATs) include, but are not limited to, hydrophobically modified polyether-polyurethanes (U.S. Pat. Nos. 4,079,028, 4,155,892, 4,496,708, 4,426,485, 4,499,233, 5,023,309 and 5,281,654), hydrophobically modified polyether-polyurethanes bearing terminal hydrophilic groups (PCT International WO 96/40820), hydrophobically modified polyether-polyols (U.S. Pat. Nos. 4,288,639, 4,354,956, 4,904,466), copolymers of ethylene oxide and long chain epoxyalkane (U.S. Pat. No. 4,304,902), hydrophobically modified polyacetal-polyethers (U.S. Pat. No. 5,574,127 ), hydrophobically modified alkali-soluble emulsions (U.S. Pat. Nos. 4,514,552, 4,421,902, 4,423,199, 4,429,097, 4,663,385, 4,008,202, 4,384,096, 5,342,883). For other references on hydrophobically modified alkali-soluble emulsions see, "E. J. Schaller and P. R. Perry, in "Handbook of Coatings Additives", Ed., L. J. Calbo, Marcel Dekker, Inc., New York, Vol. 2, 1992, Chapter 4, p. 114 and G. D. Shay in "Polymers in Aqueous Media", Ed. J. E. Glass, Advances in Chemistry Series, Vol. 223, Chapter 25, p. 480, 1989; American Chemical Society, Washington, D.C.), hydrophobically modified polyacrylamide (U.S. Pat. Nos.4, 425,469, 4,432,881, 4,463,151, 4,463,152, 4,722,962), hydrophobically modified aminoplast-polyethers (PCT International WO 96/40625 and WO 96/40185).

To thicken aqueous systems, water-soluble polymers are commonly used in dry powder form. However, there are several problems associated with the use of dry powder polymers. These include, dusting during transfer, poor dispersibility (lump formation), unusually long dissolution time, and poor handling. Particularly, complete dissolution of solid water-soluble polymers is a formidable task when they are directly added to highly filled systems, such as latex paints, containing limited amount of free water.

To eliminate these problems, manufacturers of SATs have searched for means to deliver these polymers as high solids pourable/pumpable aqueous emulsions or solutions.

One class of SATs comprised of hydrophobically modified alkali-soluble polyacrylates and hydrophobically modified polyacrylamides are made by free radical emulsion polymerization processses in water and the polymers formed remained as stable colloidal dispersions. Hence, they are currently sold as 20–50% solids dispersions. At the point of applications, these dispersions are directly added to the aqueous system to be thickened and the polymer dissolved in water by exposing them to an alkali or a base. Alternatively, they can be first dissolved in water by adding an alkali or a base and the resulting polymer solution can be added to the aqueous system to be thickened.

Another class of important SATs is based on copolymers of polyalkylene oxides and other appropriate functional reagents. These polyalkylene oxide based SATs are made by step growth copolymerization processes and are widely used in a multitude of industrial applications. Examples of such commercial SATs include hydrophobically modified polyether-polyurethanes (sold under the trademark Acrysol® RM-825 and RM-1020 by Rohm and Haas Company and Rheolate 244, 255 and 278 by Rheox, Inc.) and hydrophobically modified polyether-polyols (sold under the trademark RHEOLATE® 300 by Rheox, Inc.). Currently these SATs are sold as 20–30% solids solution in a mixture of water and a water miscible organic solvent, such as diethylene glycol monobutyl ether (also known as Butyl carbitol™) or ethylene glycol or propylene glycol. The organic cosolvents are used to suppress the solution viscosity of SATs so that they can be delivered as high solids pourable/pumpable solutions.

While these organic solvents do provide the intended function, they eventually get released to the atmosphere and contribute to environmental pollution. Due to recent changes in environmental regulations in the United States, Western Europe and other parts of the world, there is a mounting pressure to formulate waterborne systems, such as latex paints, free of volatile organic compounds (VOCs). Since the above-mentioned polyalkylene oxide based SATs are dissolved in a mixture of water and an organic cosolvent, they are not the systems of choice for formulating VOC free waterborne coatings. Hence, manufacturers of SATs have been actively seeking for ways to deliver SATs in aqueous systems free of VOCs.

U.S. Pat. Nos. 5,137,571 and 5,376,709 describe the use of cyclodextrins to suppress the solution viscosity of SATs. It has been proposed that cyclodextrins, which are cyclic oligosaccharides composed of 6, 7 or 8 α-D-anhydroglucose units, reversibly complex with the hydrophobic moieties of SATs and occasion breakdown of hydrophobic association and attendant viscosity loss.

A recent patent (U.S. Pat. No. 5,425,806), issued to Rheox, Inc., describes the use of an anionic or a nonionic surfactant to lower the solution viscosity of SATs and reduce the VOC of the thickening composition.

Although cyclodextrins and surfactants can suppress the aqueous solution viscosity of SATs, they can severely restrict the coating formulator's ability to formulate paints. This restriction could arise due to the fact that the ingredients (latex binders, pigments, extenders, surfactants, and dispersants) of VOC free waterborne coatings can interact with cyclodextrins and surfactants to occasion instability to the paint and detract from achieving the target paint properties. For example, the presence of additional surfactants or cyclodextrins arising from the thickener solution can negatively impact the viscosifying ability of the SAT and can cause excessive foaming during the manufacture of the coating. Certain latex film properties, such as early blister resistance, block resistance, water resistance, and scrub resistance could also be adversely affected by incorporation of an excess of cyclodextrins or surfactants. In addition, cyclodextrins are fairly expensive and not cost effective based on their recommended use levels for making pumpable aqueous solutions of SATs.

Hence, there is a need to develop an alternative VOC free aqueous delivery system for SATs that provide good flow, leveling, film build and gloss in latex paints.

SUMMARY OF THE INVENTION

According to the present invention there is provided a thermoplastic polymer in fine particulate form, having at least about 20% lower bulk density than the same particle size polymer obtained by grinding. The polymer is a water-soluble, synthetic or semisynthetic associative thickener having a particle size that passes through a U.S. 20 mesh screen. The polymer can be selected from the group consisting of hydrophobically modified polyether-polyurethanes, hydrophobically modified polyether-polyurethanes bearing terminal hydrophilic groups, hydrophobically modified polyacrylates, hydrophobically modified polyether-polyols, hydrophobically modified polyacrylamide, hydrophobically modified polyvinyl alcohol and copolymers thereof, hydrophobically modified aminoplast-polyethers, hydrophobically modified hydroxyethyl cellulose, hydrophobically modified hydroxypropylcellulose, hydrophobically modified hydroxypropylmethylcellulose, hydrophobically modified ethylhydroxyethylcellulose and hydrophobically modified poly(acetal- or ketal-polyethers) comprising a backbone of poly(acetal- or ketal-polyether) which has ends that are capped with hydrophobic groups independently selected from the group consisting of alkyl, aryl, arylalkyl, alkenyl, arylalkenyl, cycloaliphatic, perfluoroalkyl, carbosilyl, polycyclyl, and complex dendritic groups wherein the alkyl, alkenyl, perfluoroalkyl, and carbosilyl hydrophobic groups comprise 1 to 40 carbons, and the aryl, arylalkyl, arylalkenyl, cycloaliphatic and polycyclyl hydrophobic groups comprise 3 to 40 carbons.

The present invention provides processes for preparing fine particle size thermoplastic polymers having reduced bulk density by dissolving the polymer and rapidly insolubilizing the polymer from the solution.

According to the present invention there are further provided processes for using the polymer of the present invention in applications where reduced bulk density particulate polymer is desired, e.g., in aqueous fluid suspensions and in thickening aqueous systems such as latex paints, sizing systems, adhesives, cosmetics, pharmaceuticals, paper coatings, etc.

DETAILED DESCRIPTION OF THE INVENTION

It has surprisingly been found that very fine particles of thermoplastic polymers, such as polyalkylene oxide based SATs having lower bulk density than the SAT particles of the same particle size obtained by grinding solid SATs can be made by dissolving them in an organic solvent at elevated temperatures and allowing the solvent to evaporate from the SAT solution. The SAT particles with lower bulk density are suitable for making stable aqueous dispersions containing 20% by weight and greater of SATs in the presence of appropriate amounts of dissolved salts. When diluted with water, these polymeric aqueous dispersions dissolve rapidly without lumping.

It was also unexpectedly found that when these SATs are suspended in a salt solution and the SAT suspension is used to thicken latex paints, the amount of SAT required to thicken the latex paint was significantly less than when the SAT was delivered as a solution in 1:4 (weight basis) butyl carbitol/water mixture.

The thermoplastic polymers can be water-soluble synthetic or semi-synthetic associative thickeners (SATs and SSATs), poly(2-ethyl-2-oxazoline), GANTREZ® poly (vinyl methyl ether-co-maleic anhydride) (available from ISP Technologies, Inc.), PEMULEN® hydrophobically modified polyacrylate (available from B. F. Goodrich), KLUCEL® hydroxypropylcellulose (available from Hercules Incorporated) (polyethylene oxide, polypropylene oxide, poly(ethylene oxide-co-propylene oxide), poly (vinylpyrrolidone), poly(vinyl acetate-co-vinyl alcohol). The synthetic or semi-synthetic associative thickeners suitable for use in the present invention could be selected from the group consisting of hydrophobically modified polyether-polyurethanes, hydrophobically modified polyether-polyurethanes bearing terminal hydrophillic groups, hydrophobically modified polyacrylates, hydrophobically modified polyether-polyols, hydrophobically modified polyacrylamide, hydrophobically modified poly(vinyl alcohol) and copolymers thereof, hydrophobically modified aminoplast-polyethers, hydrophobically modified hydroxyethylcellulose, hydroxypropylcellulose, hydrophobically modified ethylhydroxyethyl cellulose and hydrophobically modified poly(acetal- or ketal-polyethers) comprising a backbone of poly(acetal- or ketal-polyether) which has ends that are capped with hydrophobic groups independently selected from the group consisting of alkyl, aryl, arylalkyl, alkenyl, arylalkenyl, cycloaliphatic, perfluoroalkyl, carbosilyl, polycyclyl, and complex dendritic groups wherein the alkyl, alkenyl, perfluoroalkyl, and carbosilyl hydrophobic groups comprise 1 to 40 carbons, and the aryl, arylalkyl, arylalkenyl, cycloaliphatic and polycyclyl hydrophobic groups comprise 3 to 40 carbons.

Compositions and processes for making such hydrophobically modified synthetic water-soluble polymers are disclosed in U.S. Pat. Nos. 4,079,028, 4,155,892, 4,496,708, 4,426,485, 4,499,233 and 5,023,309 (hydrophobically modified polyether-polyurethanes), U.S. Pat. Nos. 4,288,639, 4,354,956, 4,904,466 (hydrophobically modified polyether-polyols), U.S. Pat. No. 4,304,902 (copolymers of ethylene oxide and long chain epoxyalkane), U.S. Pat. No. 5,574,127 (hydrophobically modified polyacetal-polyethers), PCT International WO 96/40820 (hydrophobically modified polyether-polyurethanes bearing terminal hydrophilic groups), hydrophobically modified polyacetal-polyethers (U.S. Pat. No. 5,574,127), hydrophobically modified alkali-soluble emulsions (U.S. Pat. Nos. 4,514,552, 4,421,902, 4,423,199, 4,429,097, 4,663,385, 4,008,202, 4,384,096, 5,342,883 and references cited therein. For other references on hydrophobically modified alkali-soluble emulsions see, E. J. Schaller and P. R. Perry, in "Handbook of Coatings Additives", Ed., L. J. Calbo, Marcel Dekker, Inc., New York, Vol. 2, 1992, Chapter 4, p. 114 and G. D. Shay in "Polymers in Aqueous Media", Ed. J. E. Glass, Advances in Chemistry Series, Vol. 223, Chapter 25, p. 480, 1989; American Chemical Society, Washington, D.C.), hydrophobically modified polyacrylamide (U.S. Pat. Nos.4,425,469, 4,432,881, 4,463, 151, 4,463,152, 4,722,962), hydrophobically modified aminoplast-polyethers (PCT International WO 96/40625 and WO 96/40185).

Generally the upper limit of the weight average molecular weight of the polymer can be 2,000,000, preferably 500,000 and most preferably 100,000. The lower limit can be about 500, preferably 15,000 and most preferably about 20,000.

Preferably the hydrophobically modified poly(acetal- or ketal-polyethers) used in the present invention are those wherein the hydrophobic groups comprise alkyl and alkenyl groups having 8 to 22 carbon atoms and aryl, arylalkyl, arylalkenyl, cycloaliphatic and polycyclyl groups having 6 to 29 carbon atoms, more preferably wherein such alkyl and alkenyl groups have 12 to 18 carbon atoms and the aryl, arylalkyl, aryl alkenyl, cyloaliphatic and polycyclyl groups have 14 to 25 carbon atoms and most preferably wherein the alkyl groups have 16 carbon atoms.

The polymers of the present invention have a particle size that passes through a U.S. 20-mesh screen, preferably through a U.S. 40-mesh screen and most preferably through a U.S. 60-mesh screen.

In addition to or instead of the hydrophobically modified poly(acetal- or ketal-polyethers) discussed above hydrophobically modified polyether-polyurethanes as described in U.S. Pat. Nos. 4,155,892, 4,496,708, 4,426,485, 4,499,233, 5,023,309 and 5,281,654, and hydrophobically modified polyether-polyurethanes bearing terminal hydrophilic groups as described in PCT International WO 96/40820, and hydrophobically modified polyether-polyols as described in U.S. Pat. Nos. 4,288,639, 4,354,956 and 4,904,466, and hydrophobically modified polyacrylates as described in U.S. Pat. Nos. 4,514,552, 4,421,902, 4,423,199, 4,429,097, 4,663,385, 4,008,202, 4,384,096, and 5,342,883 and hydrophobically modified polyacrylamide as described in U.S. Pat. Nos. 4,425,469, 4,432,881, 4,463,151, 4,463,152, and 4,722,962, and hydrophobically modified aminoplast-polyethers as described in PCT International WO 96/40625 and WO 96/40185), can also be used to make the aqueous suspensions of the present invention. Hydrophobically modified polyurethane thickeners are low molecular weight polyether-polyurethane bearing hydrophobes. They are made by condensing relatively low molecular weight polyethylene glycol (molecular weight up to about 10,000) with hydrophobic diisocyanates and end-capping the resulting copolymers with hydrophobic alcohols or amines. They are characterized by having three or more hydrophobes-two of which are terminal and the remainder are internal. The hydrophobic groups are connected to the hydrophilic polyethylene oxide blocks through urethane linkages.

In another class of hydrophobically modified polyurethanes, disclosed in U.S. Pat. No. 4,327,008, the hydrophobes have branched structure. They are made by reacting polyalkylene oxides with a polyfunctional material, a diisocyanate, and water and end-capping the resulting product with a hydrophobic monofunctional active hydrogen-containing compound or a monoisocyanate.

Hydrophobically modified polyacrylates are alkali-soluble hydrophobically modified polyacrylates. They are made by copolymerizing a mixture of acrylic monomers with a small amount of a hydrophobic co-monomer.

The fine particle size reduced bulk density thermoplastic polymers of the present invention can be made by dissolving the polymer and rapidly insolubilizing it from the solution. This can be accomplished in a number of ways, for example:

a) Dissolve the polymer in a poor solvent at elevated temperatures and cool the solution to a temperature (ambient or below ambient temperature) at which the polymer is insoluble.

Poor solvents are those in which the polymer is substantially insoluble at ambient conditions (i.e. less than 1% by weight of polymer is dissolved, based on the weight of the solution). Examples of poor solvents include ethers, ketones, esters, hydrocarbon solvents, chlorinated hydrocarbon solvents, etc. Of these, ethers and hydrocarbon solvents with boiling points lower than 60° C. are preferred from viewpoints of operation and cost and because of their ease of removal from the polymer.

b) Dissolve the polymer in a poor solvent (e.g., tetrahydrofuran) at elevated temperature and/or pressure, and add another poor solvent of different polarity (e.g., a hydrocarbon solvent, such as hexane) to the solution.

c) Dissolve the polymer in a solvent and evaporate the solvent at a pressure lower than atmospheric pressure. The evaporated solvent may be collected by condensing the solvent vapor without a cooler.

Solvents of this type have the characteristics to dissolve the polymer to the extent of at least 1% by weight of polymer, based on the weight of solution. Examples of such solvents include: ethers, ketones, esters, hydrocarbon solvents, chlorinated hydrocarbon solvents, etc. Of these, ethers and hydrocarbon solvents with boiling points lower than 60° C. are preferred from view points of operation and cost and because of their ease of removal from polymer.

d) Dissolve the polymer in a poor solvent at ambient temperature at a pressure above atmospheric pressure and subject the solution to an environment of below atmospheric pressure and/or elevated temperature, whereby the solvent evaporates very rapidly.

e) Dissolve the polymer in a poor solvent at ambient temperature at a pressure above atmospheric pressure and cool the solution to below ambient temperature.

f) Dissolve the polymer in a solvent and subject the solution to an environment of below atmospheric pressure and/or elevated temperature, or purging with hot gas (e.g. nitrogen, helium, argon and air), whereby the solvent evaporates very rapidly.

g) Dissolve the polymer in a solvent and rapidly mix the polymer solution with a poor solvent under high shear and filter the polymer particles formed.

The preferred method is to dissolve the polymer in a poor solvent at ambient temperature at a pressure above atmospheric pressure and to subject the solution to an environment of below atmospheric pressure and/or elevated temperature whereby the solvent evaporates very rapidly.

To prepare aqueous fluid suspensions of the fine particulate reduced bulk density polymers of the present invention, organic or inorganic water-soluble salts having solubility of at least 10 wt % or higher could be used. These could be carbon containing salts, e.g. sodium or potassium salts of aliphatic or aromatic carboxylic acids. Inorganic salts, such as sodium or potassium carbonate, chloride or bromide can also be used. Preferred water-soluble salts are sodium and potassium formate and most preferred is sodium formate. The carboxylate salts can be used in combination with inorganic salts. These aqueous fluid suspensions and their process of preparation is the subject of companion application filed Oct. 17, 1997, "Fluidized Polymer Suspension of Hydrophobically Modified Poly(Acetal- or Ketal-Polyether), Polyurethane and Polyacrylate", by C. L. Burdick and A. C. Sau), the disclosure of which is hereby incorporated by reference.

An aqueous fluid suspension of 20–25 wt % solids of the SAT can be made, e.g., by adding the fine powder of the SAT to a strongly agitated aqueous solution of sodium formate containing xanthan gum. Preferably, a biocide is added before or after dispersing the SAT in the salt solution. The resulting polymeric aqueous suspension was pumpable/pourable and dissolved rapidly when added to a large excess of water under agitation. When incorporated into a latex paint, it efficiently viscosified the paint and provided good flow, leveling, film build and gloss. The aqueous fluid suspensions were stable (no phase separation, gelation or sedimentation) after 4 weeks of storage at room temperature.

The aqueous fluid suspension of the fine particulate reduced bulk density polymers of the present invention can be used to thicken aqueous systems, such as latex paints, cementitious systems, mineral slurries, joint compounds, water-borne adhesives, inks, drilling muds in oil-well drilling, aqueous systems for oil recovery, cosmetics, pharmaceuticals, coating and sizing systems for paper and paperboards, sizing and finishing systems for textiles and as additive in the manufacture of wet laid nonwoven webs. They can be used alone or in combination with at least one other thickener selected form the group consisting of hydroxyethylcellulose, hydrophobically modified hydroxyethylcellulose, hydrophobically modified ethylhydroxyethyl cellulose, methyl hydroxypropyl cellulose, ethylhydroxyethyl cellulose, carboxymethyl cellulose, polyvinyl alcohol, polyurethanes, polyacrylates, polyacrylamides, guar, guar derivatives, clays and alkali-soluble polyacrylates.

The fine particulate reduced bulk density polymers of the present invention can sol be used to fabricate light weight plastic products, as a tablet binder and tablet disintegrant, as an adjuvant to control release of drugs, as a packaging material for separating solvents by selective adsorption and to make electrorheological fluids.

The following examples illustrate further the present invention which relates to the preparation of aqueous dispersion of various SATs. However, they should not be construed as the only ones limiting this invention, as other process variations are possible without departing from the spirit and scope of the invention. Unless indicated, all parts and percentages are by weight.

Procedures

Solution viscosity measurement of polymer solutions—The solution viscosity of polymer solutions was measured using a Brookfield (BF) viscometer (Model DV-I) at 30 rpm at ambient temperatures. The results are reported in centipoises (cps).

Evaluation of paint properties—The thickener systems—aqueous dispersions or solutions—were incorporated into a UCAR® 367 vinyl-acrylic latex based interior flat paint formula (pigment volume concentration=60%) to achieve an initial viscosity of 95–100 Kreb Units (KU). The details of the vinyl-acrylic flat formulation are shown in Table 1.

Materials

Tamol® 731 A dispersant (sodium salt of polymeric carboxylic acid) available from Rohm and Haas Company.

Triton® N-101 surfactant (nonylphenoxypolyethoxyethanol nonionic surfactant) available from Union Carbide Corporation.

AMP-95 (2-amino-2-methyl-1-propanol), available from Angus Chemical Company.

Colloid 640 Antifoam, (a silica/petroleum dispersion) available from Rhône-Poulenc Inc.

Ti-Pure® R-931 titanium dioxide, available from E. I. DuPont de Nemours & Co.

Satintone® W calcined clay, available from Englehard Industries.

ECC#1 white calcium carbonate, available from ECC International.

UCAR® 367 vinyl-acrylic latex, available from Union Carbide Corporation.

Texanol® ester-alcohol coalescent [2,2,4-trimethyl-1,3-pentanediol mono(2-methylpropanoate] available from Eastman Chemical Co.

Proxel® GXL biocide, (1,3-benzisothiazolin-3-one) available from ICI Americas.

TABLE 1

UCAR ® 367 Vinyl-acrylic interior flat paint formula
BASE PAINT
Pigment Grind

| Ingredient | Grams/1000 gram |
|---|---|
| Water | 130.48 |
| Dispersant (Tamol 731 A) | 4.8 |
| Dispersant (potassium tripolyphosphate) | 1.04 |
| Triton N-101 surfactant | 2.30 |
| AMP-95 | 1.04 |
| Propylene glycol | 18.06 |
| Colloid 640 Antifoam | 1.98 |
| Water, Discretionary (added as needed for effective dispersion) | 96.97 |
| Titanium dioxide (Ti-Pure ® R-931) | 156.58 |
| Satintone W calcined clay | 130.48 |
| ECC #1 White calcium carbonate | 208.77 |

Disperse to Hegman 4 to 5 and let-down at slower speed as follows.

Letdown

| Ingredient | Grams/1000 gram |
|---|---|
| UCAR 367 Vinyl-acrylic latex | 236.22 |
| Texanol coalescent | 8.25 |
| Colloid 640 Antifoam | 1.98 |
| Biocide (Proxe ®1 GXL) | 1.04 |
| Total | 1,000.00 Grams |

The above base paint (230 g) was mixed with the thickener solution and appropriate amount of water (total weight of thickener and water=50 g) to adjust the Stormer viscosity of the paint to 97±2 KU.

Formula Constants for the Thickened Paint

| Pigment volume concentration | 60% |
|---|---|
| Nonvolatile volume | 33% |
| Nonvolatile weight | 52% |
| Pounds/gallon | 11.63 |
| Stormer viscosity (initial) | 95 KU |
| pH | 8.0 |

The significance and scale of various paint properties are indicated below.

a) Stormer viscosity, measured 24 hours after paint preparation, is measured by a Stormer viscometer at 200 $sec^{-1}$ shear rate and expressed in Kreb Units (KUs).

b) Thickening efficiency (TE) is measured as dry wt % of the thickener needed in the paint to achieve a Stormer viscosity of 95–100 KU.
c) ICI viscosity is measured by an ICI plate and cone viscometer at 12,000 sec$^{-1}$ and expressed in poise.
d) Leveling by Lenata method (measured on a scale of 0–10; 0=worst and 10=best).
e) Spatter resistance by Lenata method, mid-range bar, wet film thickness (in mils) above which sag occurs.
f) Spatter resistance by roll-out over a black panel (compared on a scale of 0–10; 0=worst and 10=best).

EXAMPLE 1

$C_{16}$-Capped poly(acetal-polyether) ($C_{16}$-PAPE) was made as follows:

To an Abbe ribbon blender were added polyethylene glycol [PEG-8000, MW~8000 (1250 g)] and sodium hydroxide (37 g). After sealing the reactor, the mixture was heated at 80° C. for one hour. Then dibromomethane (18.5 g) was added to the PEG-8000/NaOH mixture and the resulting reaction mixture heated at 80° C. for 4 hours to form the PEG-8000/methylene copolymer.

To the PEG-8000/methylene copolymer at 80° C. was added 1-bromohexadecane (65 g) and the resulting reaction mixture heated at 120° C. for 2 hours. Following this, the reactor was opened and the molten reaction mixture poured into a plastic tray. Upon cooling to room temperature, the reaction mixture solidified.

The crude reaction mixture was soluble in water (2% solution BF viscosity at 30 rpm-410 cps).

A sample of this $C_{16}$-PAPE was ground in a coffee grinder and the ground material screened through a U.S. 20 mesh screen. The bulk density of the screened material (passing through U.S. 20 mesh screen) was 0.54 g/cc.

EXAMPLE 2

The $C_{16}$-PAPE of Example 1 (350 g) was suspended in tetrahydrofuran (750 ml) in a closed stainless steel pressure reactor and the resulting suspension heated to 60° C. and held at 60° C. for 1 hour. The solution was cooled to room temperature and transferred onto a plastic tray. The solvent was allowed to evaporate inside a hood to obtain a fluffy material that was ground with a mortar and pestle. The ground polymer was screened through U.S. 20 mesh screen.

The bulk density of the screened material (passing through U.S. 20 mesh screen) was 0.4 g/cc.

EXAMPLE 3

Keltrol RD xanthan gum (available from Kelco) (0.6 g) was dissolved in water (164.1 g). To this solution was added sodium formate (75 g) and the resulting mixture stirred till the sodium formate dissolved. Then to this well-agitated solution of xanthan/sodium formate was slowly added finely divided particles (passing through U.S. 20 mesh screen) of $C_{16}$-PAPE (60 g) prepared according to Example 2. The resulting suspension was stirred for 2 hours after adding 17% solution of 1,3-benzisothiazolin-3-one (0.3 g) (available from ICI Americas under the trademark Proxel® GXL) and allowed to stand overnight. Next day the suspension was stirred again to form a smooth pourable suspension which was stable after storing at room temperature for two months.

A 2% polymer solution (based on the amount of active $C_{16}$-PAPE) of the above suspension was made by adding appropriate amount of water. The BF viscosity of this 2% solution, measured at 30 rpm, was 437 cps.

EXAMPLE 4

The $C_{16}$-PAPE aqueous suspension of Example 3 and a 25% solids solution of the same $C_{16}$-PAPE in 1:4 (weight basis) butyl carbitol/water mixture were evaluated in a vinyl-acrylic flat paint formula. The paint properties of these two systems were compared. As can be seen from the data below, both thickener systems provided very similar paint performance properties. However, the use level of active $C_{16}$-PAPE to thicken the paint to the same Stormer viscosity was significantly less when the $C_{16}$-PAPE was delivered as an aqueous suspension in the presence of a salt.

| Thickener system | TE (wt %) | KU (I/O) | ICI (Poise) | Level | Sag | Spatter | Hiding |
|---|---|---|---|---|---|---|---|
| $C_{16}$-PAPE Aqueous suspension | 0.52 | 97/102 | 1.7 | 9 | 11 | 9 | 0.965 |
| $C_{16}$-PAPE solution | 0.83 | 94/100 | 2.0 | 9 | 8 | 9 | 0.964 |

I = Initial; O = After overnight storage.

EXAMPLE 5

A $C_{12}$-PAPE was made according to Example 1 using 1-bromododecane (70 g) as the capping agent.

30 g of this $C_{12}$-PAPE and 70 g of the $C_{16}$-PAPE prepared in Example 1 were mixed together. Finely divided particles of this blend were made according to Example 2. A stable aqueous suspension was made from this blended polymer system according to Example 3. The suspension was homogeneous, smooth and pourable.

EXAMPLE 6

A $C_{12}/C_{16}$ mixed hydrophobe end-capped PAPE ($C_{12}/C_{16}$-PAPE was made according to Example 1 using 1-bromododecane (20 g) and 1-bromohexadecane (50 g) as the capping agents.

A fluffy version of this $C_{12}/C_{16}$-PAPE was made according to Example 2. An aqueous suspension of this fluffy material passing through U.S. 20 mesh screen was made according to Example 3 using the following ingredients.

Xanthan—0.4 g
Water—99.4 g
Sodium formate—50 g
$C_{12}/C_{16}$-PAPE—50 g
Proxel GXL—0.2 g The suspension was homogenous, pourable and stable.

EXAMPLE 7

Acrysol® RM-825 (available from Rohm and Haas Company) is a 25% solids solution of a hydrophobically modified polyether-polyurethane in 1:4 (w/w) butyl carbitol/water mixture. In order to recover the solid polymer, the polymer solution (500 g) was poured onto a glass tray and solvent was allowed to evaporate inside a hood. After ten days, a gluey solid was formed. This material was slurried in hexane (1000 ml) and washed three times with hexane (1000 ml) to remove residual organic solvent. The solid polymer thus isolated was dried overnight at room temperature in a vacuum oven. A fluffy solid of this polymer was made according to Example 2.

This fluffy solid of this hydrophobically modified polyether-polyurethane was ground with a mortar and pestle and screened through U.S. 20 mesh screen. The particles passing through U.S. 20 mesh screen were used to make the aqueous suspension in conjunction with other polymers described in Example 8.

EXAMPLE 8

An aqueous suspension of a 9:21:30 (weight basis) blend of the fluffy versions of the $C_{12}$-PAPE of Example 5, $C_{12}/C_{16}$-PAPE of Example 6 and Acrysol® RM-825 hydrophobically modified polyether-polyurethane thickener of Example 7 was made according to Example 3. The aqueous suspension was stable.

EXAMPLE 9

Example 3 was repeated using a 1:3 (weight basis) blend of the fluffy versions of the $C_{16}$-PAPE and Acrysol® RM-825 hydrophobically modified polyether-polyurethane thickener of Example 7. The aqueous suspension was stable.

EXAMPLE 10

A $C_{12}/C_{14}$-PAPE was made according to Example 1 using 1-bromododecane (55 g) and 1-bromotetradecane (28 g) as the capping agents. The isolated solid polymer was ground in a coffee grinder and the ground polymer screened through U.S. 20 mesh screen.

An aqueous suspension of this screened material was made according to Example 3 using the following materials.
Xanthan—0.4 g
Water—99.4 g
Sodium formate—50 g
$C_{12}/C_{14}$-PAPE (particles screened through U.S. 20 mesh screen)—50 g
Proxel GXL—0.2 g When allowed to stand for 12 hours at room temperature, the aqueous suspension gelled and the polymer particles phase separated.

By contrast when the same $C_{12}/C_{14}$-PAPE was converted into a fluffy material according to Example 2 and an aqueous suspension was made according to Example 3 using the above ingredients and the fluffy version of $C_{12}/C_{14}$-PAPE (passing through U.S. 20 mesh screen), a stable suspension was formed.

EXAMPLE 11

Example 10 was repeated using a $C_{12}/C_{16}$-PAPE made according to Example 1 using 1-bromododecane (20 g) and 1-bromohexadecane (50 g) as the capping agents. It was found that the $C_{12}/C_{16}$-PAPE powder made by grinding the solid polymer in a coffee grinder and screened through U.S. 20 mesh screen did not form a stable suspension. By contrast, the fluffy version of the $C_{12}/C_{16}$-PAPE made according to Example 2 did form a stable suspension.

EXAMPLE 12

A $C_{16}$-PAPE was made according to Example 1 using the following reagents.
Polyethylene glycol (MW~8000)—1250 g ("as is")
Sodium hydroxide—30 g
Dibromomethane—15 g
1-Bromohexadecane—75 g Example 9 was repeated using this $C_{16}$-PAPE. It was found that the $C_{16}$-PAPE powder made by grinding the solid polymer in a coffee grinder and screened through U.S. 20 mesh screen did not form a stable suspension. By contrast, the fluffy version of the $C_{16}$-PAPE made according to Example 2 did form a stable suspension.

EXAMPLE 13

An aqueous suspension of the fluffy version of Acrysol® RM-825 hydrophobically modified polyether-polyurethane was made according to Example 3. When this aqueous suspension was allowed to stand overnight, a top layer comprised of suspended polymer particles resulted. However, after mixing the suspension, the polymer particles were homogeneously distributed in the aqueous phase.

EXAMPLE 14

In order to prepare reduced bulk density fine particles of Rheolate 205 and 208 polyurethane associative thickeners available from Rheox, Inc. and Coatex BR 910 P polyurethane associative thickener available from Coatex, France, dissolve the polymer (350 g) in boiling tetrahydrofuran (750 ml). After the polymer is dissolved, pour the polymer solution onto a plastic tray. Allow the solvent to evaporate inside a hood to obtain a fluffy solid. Grind the fluffy solid polymer and sieve the powder through U.S. 20 mesh screen.

Use the above fine polymer particles, to prepare a stable aqueous suspension by adding 60 g of the particulate polymer to a solution of xanthan gum (0.6 g), sodium formate (75 g) and Proxel GXL (0.3 g) in water (164.1 g) as described in Example 3.

EXAMPLE 15

Combine Carbowax® 8000 poly(ethyleneoxy)glycol, M.W. 8,000 (available from Union Carbide Chemicals and Plastics, Inc.) (300 grams, 0.0357 moles), Igepal RC-620 available from Rhône-Poulenc, Surfactant & Specialities, (23.0 grams, 0.0338 moles), a mixture of dodecylphenolethoxylates, with 1356 grams toluene in a 2 liter reaction vessel fitted with a Dean Stark water trap. Reflux the mixture under nitrogen to remove water by azeotropic distillation. Remove, the Dean Stark trap and fit a distillation column to the flask. Add Powderlink 1174 glycoluril available from Cytec Industries (15.92 grams, 0.050 moles) and raise the temperature to 100° C. and add Nacure 5076 (available from King Industries), (1.38 grams) dodecylbenzene sulfonic acid. Apply vacuum to reduce the pressure inside the vessel to approximately 510 mm Hg. At this pressure the toluene distills at a slow, steady rate. Constantly replenish the toluene to maintain a constant solvent level. Proceed with this for 125 minutes at which time the viscosity is "X" on the Gardner bubble scale. Cool the copolymer solution to 70° C. and add methylethanolamine (0.53 gram) to quench the acid. Cool the hydrophobically modified aminoplast polyether copolymer solution further to 60° C. and then pour out onto trays to air dry. Cut the dried polymer into small pieces and dissolve at 20% polymer solids in a 4/1 water-diethylene glycol monobutyl ether mixture.

In order to prepare reduced bulk density fine particles of the above hydrophobically modified aminoplast polyether dissolve the polymer (350 g) in boiling tetrahydrofuran (750 ml). After the polymer is dissolved, pour the polymer solution onto a plastic tray. Allow the solvent to evaporate inside a hood to obtain a fluffy solid. Grind the fluffy solid polymer and sieve the powder through U.S. 20 mesh screen.

Use the above fine polymer particles, to prepare a stable aqueous suspension by adding 60 g of the particulate polymer to a solution of xanthan gum (0.6 g), sodium formate (75 g) and Proxel GXL (0.3 g) in water (164.1 g) as described in Example 3.

What is claimed is:

1. A thermoplastic water soluble associative polymer obtained by dissolving and insolubilizing to form in fine particulate form said polymer, having at least about 20% lower bulk density than the same particle size polymer obtained without dissolving and insolubilizing but only by grinding, wherein the polymer is selected from the group consisting of hydrophobically modified polyether-polyurethanes, hydrophobically modified polyether-polyurethanes bearing terminal hydrophilic groups, hydrophobically modified polyacrylates, hydrophobically modified polyvinyl alcohol and copolymers thereof, hydrophobically modified polyether-polyols, hydrophobically modified polyacrylamide, hydrophobically modified aminoplast-polyethers, hydrophobically modified hydroxyethylcellulose, hydrophobically modified hydroxypropylcellulose, hydrophobically modified hydroxypropylmethylcellulose, hydrophobically modified ethylhydroxyethylcelullose and hydrophobically modified poly(acetal- or ketal-polyethers) comprising a backbone of poly(acetal- or ketal-polyether) which has ends that are capped with hydrophobic groups independently selected from the group consisting of alkyl, aryl, arylalkyl, alkenyl, arylalkenyl, cycloaliphatic, perfluoroalkyl, carbosilyl, polycyclyl, and complex dendritic groups wherein the alkyl, alkenyl, perfluoralkyl, and carbosilyl hydrophobic groups comprise 1 to 40 carbons, and the aryl, arylalkyl, arylalkenyl, cycloaliphatic and polycyclyl hydrophobic groups comprise 3 to 40 carbons.

2. The polymer of claim 1, wherein the polymer has a particle size that passes through a U.S. 20 mesh screen.

3. The polymer of claim 1 wherein the upper limit of the weight average molecular weight of the polymer is about 2,000,000.

4. The polymer of claim 1 wherein the lower limit of the weight average molecular weight of the polymer is about 500.

5. The polymer of claim 1 having a particle size that passes through a U.S. 20 mesh screen wherein the weight average molecular weight of the polymer is from about 500 to about 2,000,000.

6. The polymer of claim 5 wherein the polymer is poly(acetal-or-ketal-polyether) wherein the alkyl groups have 8 to 22 carbon atoms and the aryl, arylalkyl, cycloaliphatic and polycyclyl groups have 6 to 29 carbon atoms.

7. The polymer of claim 5 having a particle size that passes through a U.S. 40 mesh screen.

8. The polymer of claim 5 wherein the lower limit of the weight average molecular weight of the polymer is about 15,000.

9. The polymer of claim 5 wherein the upper limit of the weight average of the polymer is about 500,000.

10. The polymer of claim 6 having a particle size that passes through a U.S. 40 mesh screen wherein the lower limit of the weight average molecular weight of the polymer is about 15,000 and the upper limit of the weight average molecular weight of the polymer is about 500,000.

11. The polymer of claim 10 wherein the alkyl and alkenyl groups have 12 to 18 carbon atoms and the aryl, arylalkyl, arylalkenyl, cycloaliphatic and polycyclyl groups have 14 to 25 carbon atoms.

12. The polymer of claim 10 having a particle size that passes through a U.S. 60 mesh screen.

13. The polymer of claim 10 wherein the weight average molecular weight of the polymer is from about 20,000 to about 100,000.

14. The polymer of claim 11 having a particle size that passes through a U.S. 60 mesh screen wherein the weight average molecular weight of the polymer is from about 20,000 to about 100,000.

15. The polymer of claim 11 wherein the alkyl groups have 16 carbon atoms.

* * * * *